(12) United States Patent
Mohanty et al.

(10) Patent No.: US 11,530,985 B2
(45) Date of Patent: Dec. 20, 2022

(54) CANCER DIAGNOSIS BY REFRACTIVE INDEX MULTIFRACTALITY

(71) Applicant: Nanoscope Technologies LLC, Bedford, TX (US)

(72) Inventors: Samarendra Kumar Mohanty, Arlington, TX (US); Nirmalya Ghosh, West Bengal (IN); Sulagna Bhattacharya, Arlington, TX (US)

(73) Assignee: Nanoscope Technologies, LLC, Bedford, TX (US)

( * ) Notice: Subject to any disclaimer, the term of this patent is extended or adjusted under 35 U.S.C. 154(b) by 0 days.

(21) Appl. No.: 17/151,351

(22) Filed: Jan. 18, 2021

(65) Prior Publication Data
US 2021/0140882 A1    May 13, 2021

Related U.S. Application Data

(63) Continuation of application No. 15/696,163, filed on Sep. 5, 2017, now abandoned, which is a (Continued)

(51) Int. Cl.
*G01N 21/47* (2006.01)
*G01J 3/02* (2006.01)
(Continued)

(52) U.S. Cl.
CPC ............ *G01N 21/47* (2013.01); *G01J 3/0248* (2013.01); *G01J 3/0256* (2013.01); *G01J 3/0272* (2013.01);
(Continued)

(58) Field of Classification Search
CPC ...... G01J 3/0248; G01J 3/0256; G01J 3/0272; G01N 2021/0112; G01N 2021/1744;
(Continued)

(56) References Cited

U.S. PATENT DOCUMENTS

| | | | | |
|---|---|---|---|---|
| 6,198,107 B1 * | 3/2001 | Seville | ............... | G01N 21/6447 356/417 |
| 2003/0173525 A1 * | 9/2003 | Seville | ............... | G01N 21/6447 250/458.1 |

(Continued)

OTHER PUBLICATIONS

Nandan Das, Subhash Chatterjee, Satish Kumar, Asima Pradhan, Prasanta Panigrahi, I. Alex Vitkin & Nirmalya Ghosh, "Tissue multifractality and Born approximation in analysis of light scattering: a novel approach for precancers detection," Scientific Reports vol. 4: 6129| DOI: 10.1038/srep06129 (Year: 2014).*

(Continued)

*Primary Examiner* — Violeta A Prieto
(74) *Attorney, Agent, or Firm* — Shirley A. Recipon

(57) ABSTRACT

A label-free optical device for near real time quantification of the multifractal micro-optical properties of a sample includes a source of broadband light; a tunable filter that receives at least a portion of the broadband light and then transmits narrowband light, whereby a specific band of light is selected to avoid unwanted absorption of light by the sample; where the narrowband light is configured to illuminate a selected area of the sample, and in response elastically-scattered light is dispersed from the sample; a light collection device configured to collect at least some of the elastically-scattered light; where at least some of the collected elastically-scattered light is configured to be transmitted to a detector by the light collection device, and the detector is configured to record a light scattering signal; and where the detector is configured to perform light scattering signal measurements at multiple angles or wavelengths to determine a refractive index multifractality of the sample.

8 Claims, 15 Drawing Sheets

Related U.S. Application Data continuation-in-part of application No. 15/241,723, filed on Aug. 19, 2016, now abandoned.

(60) Provisional application No. 62/206,975, filed on Aug. 19, 2015.

(51) Int. Cl.
*G01N 21/01* (2006.01)
*G01N 21/29* (2006.01)
*G01N 21/49* (2006.01)
*G01N 21/17* (2006.01)

(52) U.S. Cl.
CPC ............ *G01N 21/29* (2013.01); *G01N 21/49* (2013.01); *G01N 2021/0112* (2013.01); *G01N 2021/177* (2013.01); *G01N 2021/1744* (2013.01); *G01N 2021/4702* (2013.01); *G06T 2207/20056* (2013.01)

(58) Field of Classification Search
CPC ..... G01N 2021/177; G01N 2021/4702; G01N 21/29; G01N 21/47; G01N 21/49; G01N 2021/4709; G01N 21/27; G01N 21/41; G06T 2207/20056

See application file for complete search history.

(56) References Cited

U.S. PATENT DOCUMENTS

| 2011/0026789 A1* | 2/2011 | Hsu | ...................... G06V 40/193 382/128 |
| 2015/0293140 A1* | 10/2015 | Barille | ...................... G01P 5/26 382/276 |
| 2022/0206317 A1* | 6/2022 | Sung | ...................... G02C 7/027 |

OTHER PUBLICATIONS

Nandan Das, Subhasri Chatterjee, Satish Kumar, Asima Pradhan, Prasanta Panigrahi, I. Alex Vitkin & Nirmalya Ghosh, "Supplementary InformatioTissue multifractality and Born approximation in analysis of light scattering: a novel approach for precancers detection," Scientific Reports vol. 4: 6129 (Year: 2014).*

* cited by examiner

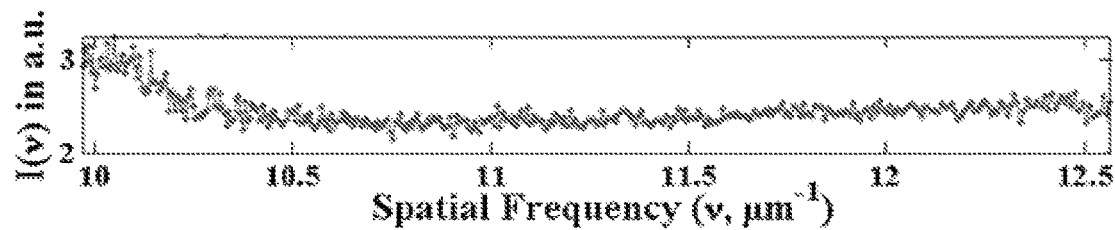
FIG. 13A
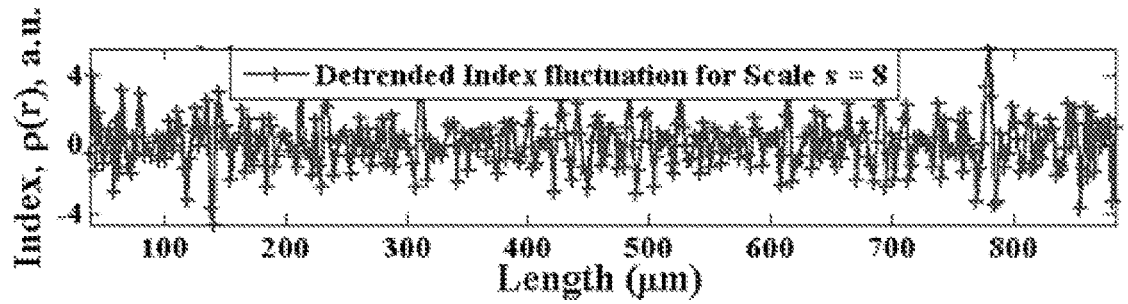
FIG. 13B
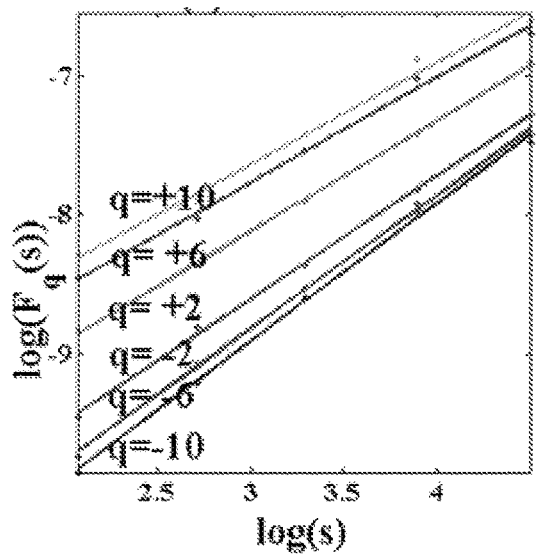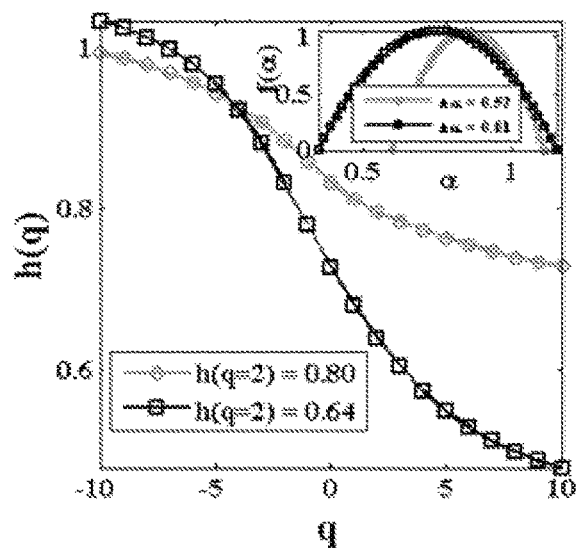
FIG. 13C  FIG. 13D

CANCER DIAGNOSIS BY REFRACTIVE INDEX MULTIFRACTALITY

Cancer Diagnosis by Refractive Index Multifractality 0.01] This application is a continuation of U.S. Nonprovisional application Ser. No. 15/696,163, filed Sep. 5, 2017, which is a continuation-in-part of and claims the benefit of U.S. Nonprovisional application Ser. No. 15/241,723, filed 19 Aug. 2016, which in turn claims priority to U.S. Provisional Application No. 62/206,975, filed 19 Aug. 2015, each of which is hereby incorporated by reference in its entirety.

BACKGROUND

1. Field of the Invention

The present application relates generally to the field of the diagnosis and classification of different pathological grades of different cancers. More specifically, the invention provides new label-free optical method for near real time quantification of the multifractal micro-optical properties from the recorded tissue light scattering signal.

2. Description of Related Art

Most cancer patients are diagnosed at a late stage due to lack of hospital facilities, when treatment is less successful and treatment-associated morbidity is more severe. Even though the biopsy is the only way to make a definitive cancer diagnosis and provides the most accurate analysis of cancer, erroneous judgments can occur, especially in the early stage, because morphological changes in cells occurs when cancer has already progressed. Additionally, the biopsy examination takes from several days to know the result; the additional hospital visit is required to remove the cancerous tissue. Therefore, there is an urgent need for a new noninvasive, point-of-care early cancer diagnosis method, having following attributes: (i) Reliable collection of data can be performed in-situ so that any health caregiver can examine suspicious sites; (ii) Quantitative analysis can be performed in a statistically rigorous manner in near realtime using validated clinical data library and algorithms. Further required attributes include: (i) Device (smart phone based) can be operated on battery; (ii) Analysis is fully automated on a user-friendly mobile App, and the procedure is so simple that it does not require highly experienced personnel, resulting in low cost and fast analysis; and (iii) Information can be sent/shared using the same acquisition/analysis device for further action (e.g. decision on treatment modality).

Cancers are characteristically silent in their early stages resulting in late diagnosis often at an advanced and incurable stage. Over 90% of cancer related deaths result from metastasized cancer. Significant portion of cancer patients have painless symptoms but the same symptom can result from infection or inflammation. Early detection of cancer (via routine screening) can greatly increase the chances for successful and recurrence-free treatment. For example, since 5 year survival rate of local oral cancer (stages I and II) is >90%, early diagnosis can significantly reduce oral cancer related death (5 yr survival rate of distant oral cancer on floor of mouth is 20%). Further, the American Cancer Society's estimates for brain and spinal cord tumors in the United States for 2015 include both adults and children. About 23,770 malignant tumors of the brain or spinal cord (13,350 in males and 10,420 in females) will be diagnosed, excluding benign tumors. About 16,050 people (9,440 males and 6,610 females) will not survive from brain and spinal cord tumors. The importance of obtaining an early cancer diagnosis is highlighted from the mortality rates that have not gone down for decades. Over 90% of cancer related deaths result from metastasized cancer. Early detection of cancer (via rigorous experimental and theoretical analysis) can greatly increase the chances for successful and recurrence-free treatment. During awake neurosurgery, the tumor is surgically removed using image guidance technology and hence near real time classification of cancerous tissue is of great importance because of the important factors—(1) reduce the chance for reoccurrence of cancer due to traces of cancerous cells (2) High speed and accurate analysis that accounts for the nano-level architectural changes in the cell. Use of biomarkers is not a viable cost-effective approach for cancer detection.

Direct visual inspection of tissue/autofluorescence has shown encouraging results in high-prevalence populations, but these techniques require subjective interpretations, which depend on the visual recognition skills of the examiner. Further, recent studies of wide-field autofluorescence imaging in low-prevalence populations suggest that benign lesions such as inflammation may give rise to false-positive results.

Currently, the biopsy is the only way to make a definitive cancer diagnosis. Pathologists receive a biopsy sample, stain the sample, and inspect it directly. Nevertheless, erroneous judgments occur in the examination, as these are based on training and experience of the examiner. Further, nano-level changes in intra-cellular architecture in very early stage of cancer can be missed in pathological examination since morphological changes (e.g. increase in nucleus to cytoplasm ratio) occur only in later stages of cancer.

Cytology is a technique similar to biopsy, except specimens are collected from pap smears, sputum, or body fluids. This has the same shortcomings as those for biopsy. There are problems with sensitivity, and inter-observer and intra-observer variability. Cancer detection using exfoliative cytology can be challenging and some cancers may be missed, or may be confused with non-cancerous cells. Subjective judgments from cytopathologists reduce the sensitivity, and result in diagnosis varying among cytopathologists and institutions. Due to low sensitivity, cytology is usually employed as a supplemental tool and biopsy is needed to make a definitive diagnosis. This method is time-consuming, has low sensitivity and requires skilled manpower and expensive microscope.

Several optical imaging techniques like coherence gated imaging, polarization gated imaging and diffuse optical tomography are being actively pursued for imaging and diagnosis of cancers. Progression of cancer (specifically at an advanced stage) leads to observable changes in tissue optical properties which are accordingly exploited as source of image contrast in these optical imaging modalities. Accordingly, the high (micron scale) resolution ballistic imaging techniques (employing coherence, space, polarization gating etc. to eliminate multiply scattered light) have been developed for imaging suspected areas in superficial tissues. Diffused light imaging on the other hand, exploits multiply scattered light for deep tissue imaging, albeit with lower spatial resolution. Either of these modalities has been explored with reasonable success for imaging cancers (grown tumors) and for surgical guidance. In contrast to advanced stages of cancers, changes in the physical properties of tissue scattering sources (and/or in the chemical compositions of tissue) are rather subtle in the pre-invasive disease (precancers).

For optical spectroscopic diagnosis, both elastically and in-elastically scattered light from tissues have been exploited. The in-elastically scattered light via processes like fluorescence and Raman contain useful biochemical information about the sample that can be employed for probing subtle biochemical changes as signatures of disease progression. On the other hand, elastically scattered light from biological tissues also contain wealth of morphological, structural and functional information, which are exploited for diagnosis. Diffuse reflectance, laser induced autofluorescence, and Raman spectroscopic methods have been attempted for diagnosis of different types of cancers over past decade. While diffuse reflectance based methods have not been able to produce enough specificity and sensitivity, the equipment required for fluorescence/Raman spectroscopy are bulky and not affordable for mass-scale point-of-care diagnosis of cancer.

Label-free optical methods, due to their non-invasive nature, are providing novel approaches for diagnosis and imaging of cancer. Indeed, various optical spectroscopic techniques such as autofluorescence and Raman spectroscopy have yielded promising results for cancer diagnosis. Further, several optical imaging techniques like coherence gated imaging, polarization gated imaging and diffuse optical tomography are also being actively evaluated for cancer diagnosis. Despite the emergence of all these label-free cancer screening methods, detecting precancerous changes remain to be a clinically unsolved. Indeed, there is still no noninvasive, portable device available to assess the precancerous grades with desirable sensitivity.

Up to date, none of these methods can meet the requirements of point-of-care, noninvasive, cost-effective detection in real-time with high sensitivity and specificity for early cancer diagnosis.

Fractal (self similar) measures are usually characterized by regular (exact fractals) or random (statistical fractals) hierarchical scaling down to arbitrarily small scales. Remarkably, such self-affine scaling has been observed to manifest in diverse natural structures and processes, ranging from complex biological systems to stock market fluctuations. While most of the naturally observed self-similar structures and processes typically exhibit monofractal behavior that can be adequately described by a single scaling exponent (known as the Hurst exponent H), a few special class of complex processes are associated with more complicated scaling behavior which may be thought of as consisting of many interwoven fractal subsets, each of them characterized by their own local scaling exponent.

Multifractality as ultrastructural state of the tissue and its relation to elastic light scattering: Elastic scattering of light in tissue originates from the micro/nano-scale spatial fluctuations of refractive index (RI) at the cellular, sub-cellular and extra-cellular levels. For many types of tissues, the spatial-scaling distribution of refractive index exhibits statistical selfsimilarity (fractality).

The spatial distribution of tissue refractive index exhibits multifractality (multi scale self similarity), indicative of its morphological and ultra-structural tissue content. In the initial studies, the signature of multifractality was observed from the differential interference contrast (DIC) image of resected tissue sections (note DIC image yields spatial distribution of refractive index). Multifractality was manifested as multiple slopes in the Fourier Power spectrum of the generated 1D RI fluctuation series (log-log plot of the Power vs spatial frequency $\nu$ yielded multiple slopes at different $\nu$-ranges). This signature of multifractality was confirmed further and quantified employing multifractal detrended fluctuation analysis (MFDFA), a state-of-the-art tool for multifractal research. DIC imaging requires transmission of light through the sample. Therefore, though this method (via DIC imaging) is applicable for characterizing tissue slices, diagnosis of cancer required in-vivo measurements (reflection mode).

Although strides have been made, considerable shortcomings remain.

SUMMARY OF THE INVENTION

In order to meet the challenges, the inventor has created a device and method for near real-time acquisition and quantification of the multifractal micro-optical properties (from the recorded light scattering signal from tissue).

In one aspect, the disclosed invention is to extract the multifractality using simple geometry by utilizing the scattered intensity (as a function of wavelength for a fixed angle), which is related to the Fourier power spectra of the spatial variation of refractive index (RI) of tissue (valid Born approximation), details in FIG. 1. This approach for determination of multifractality of tissue allows portable spectroscopic instrumentation and label-free detection of ultrastructural changes in tissues and other materials.

In another aspect, the presently disclosed invention provides the use of quantitative multifractal parameters (generalized Hurst exponent and width of the singularity spectrum) for their use in the classification of different pathological grades of cancers and precancer stages.

In contrast to existing invasive biopsy-based pathology, the presently disclosed invention (device and method) is fully non-invasive (FIG. 2). FIG. 2 illustrates a schematic for quantifying refractive index multifractality for cancer screening. A fiber-optically coupled white light source to illuminate sample (biopsied tissue or in-vivo) and a compact spectrometer connected/mounted/integrated with smartphone/laptop/tablet/PC. Since this method is based on elastic scattering spectroscopy, it utilizes very low power (~100 µW) of incoherent white light and exposure much below the maximum permissible exposure. This allows examination of multiple sites of the organ of interest and the whole process can be repeated without damaging the tissue for longitudinal diagnosis.

Unlike conventional spectroscopic methods (diffuse reflectance, fluorescence or Raman), the presently disclosed invention (device and method) is based on extracting the multifractal features from the elastic scattering spectrum (FIG. 3A), and not on overall intensity. Further, the spectrum is acquired fast (<1 sec) enough to reduce the variability in back-scattered light intensity due to the nature of contact of the probe with the tissue surface, thus, significantly minimizing measurement/discrimination error. Reliable collection of data can be performed insitu so that the patient him/herself or any non-trained care-giver can examine suspicious sites of the organ.

Since the presently disclosed invention (device and method) is based on elastic light scattering spectroscopy with low spectral resolution (1-5 nm), the requirement on optical/mechanical components and packaging is less-stringent. Furthermore, utilization of light source, camera, data acquisition, processing and sharing can be done using consumer-grade off-the-shelf, low-cost smart-phone with an open-source, that probes the multifractal microoptical tissue properties as novel precancer biomarker identification metrics. With cell phones and communication being widely available, the operation cost is minimal since no consumable is required except cleaning/change of the probe tip. The caregivers will require minimal training for its operation and maintenance.

In another aspect, the presently disclosed invention (device and analysis) can be adapted with smart phone (mountable/attachable). Further, the white light source and camera of the smart-phone powered by battery can be used for the spectroscopic recording. Therefore, it is operable in locations with limited or no access to electricity, landline communication, and laboratory.

In another aspect, the presently disclosed invention (device and analysis) is attached/developed on an inverted/upright microscope with fiber optics and/or free-space optics for delivery of light to sample and/or collection of scattered light from sample to the spectrometer.

In another aspect, the multifractality map of tissue samples is obtained by scanning the sample stage and recording the elastically scattered spectra from each point. Alternatively, the wavelength of light source is tuned by use of scanning spectrometer and images of the specimen are sequentially captured using any camera at different wavelengths. Thus, spectrum from each pixel of the image is obtained allowing further analysis and generation of multifractal map.

Using the presently disclosed invention (device and method), quantitative analysis and scoring of cancer grade is performed in a statistically rigorous manner in near real-time using validated clinical data library and algorithms stored in the device itself. Analysis is fully automated on a user-friendly mobile app, which also carry out self-calibration and internal checks on device performance. Thus, the procedure is very simple and does not require judgment of personnel, minimizing diagnosis error.

Further embodiments include the use of algorithms and user-friendly mobile app for insitu acquisition and classification via communication with database in a cloud server. Patient information along with quantitative analysis and scores from multiple sites can be sent to local health-care facility using the same acquisition/analysis device for further action (e.g. repeat screening or decision on treatment modality).

Further embodiments include a schematic of an Integrated Spectral-Spatial Multifractal Imaging System (ISSMIS). In this configuration, the white light from the source is coupled to a microscope via a spectrometer (which acts as a wavelength selection device) to illuminate the sample, allowing collection of images at different wavelengths. The system is interfaced with Multispectral Image Acquisition and Multifractal Analysis Software (MIAMAS) for high throughput and automated image acquisition and multifractal analysis.

Furthermore, the presently disclosed invention (device and method) can easily be integrated with current endoscopy for screening of many cancer types (e.g. colon, stomach, cervical, pancreatic and bladder). Early detection of cancer in a minimally-invasive manner will be highly valuable. In the case of breast cancer, 5-year relative survival rate after breast cancer diagnosis and treatment is 100-93% for stage 0-2, but it significantly decreases to 22% for stage 4. Similarly, in the case of lung cancer, 5-year relative survival rate is 31% for stage 1, but it drops to 2% at stage 4. Therefore, it is very important to reliably and precisely detect any type of cancer in its early stage(s).

Details associated with the embodiments described above and others are described below.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 10C shows a Nanospectro device in action on human skin multifractality measurement. FIG. 10D shows Inter-subject and inner-subject variation of RI-MF parameters of skin measured by NanoSpectro-Vivo. N=10 different skin sites/healthy subject. Average±Standard Deviation. No statistical significant difference between the two healthy subjects.

FIGS. 13A-13D are graphs showing an example of extraction of tissue multifractality through inverse analysis.

Figure 1:
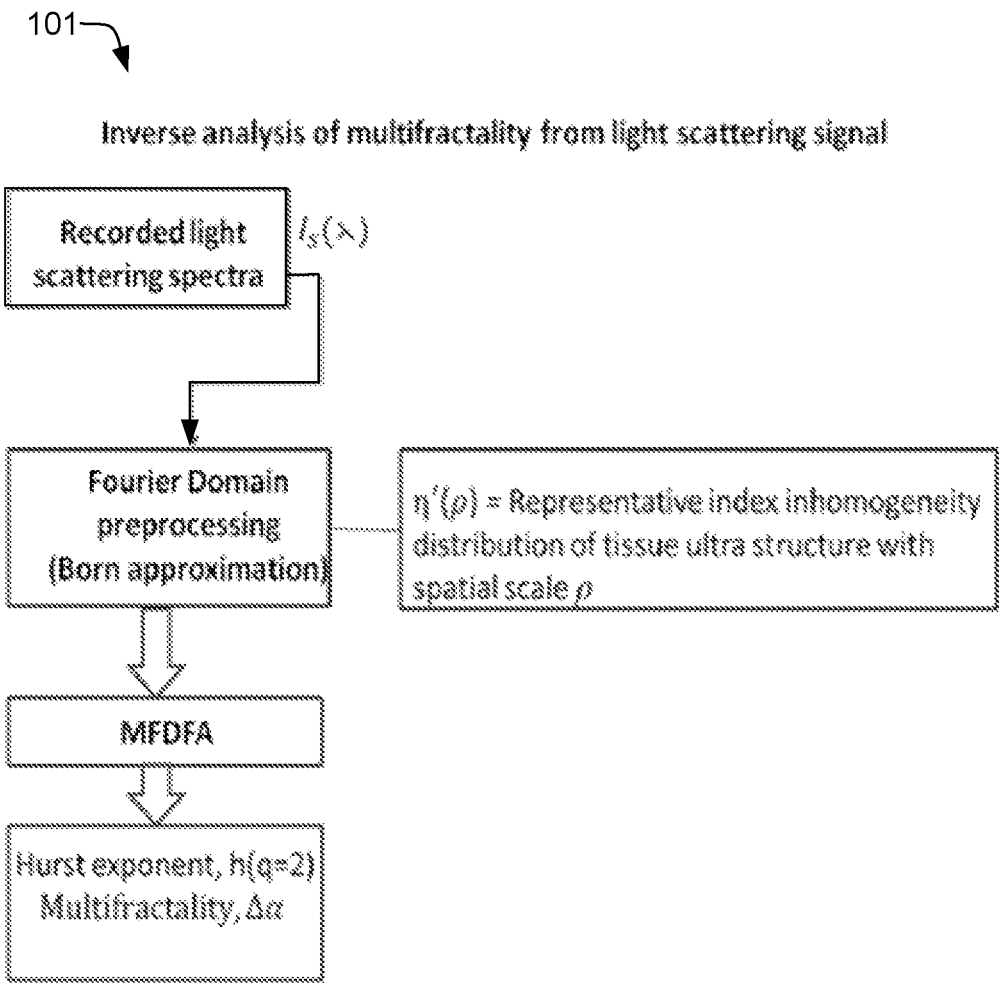
FIG. 1 shows aspects of a flow chart outlining various steps used with an optical device of the present application used in proposed inverse analysis of refractive index multifractality from a tissue light scattering signal.

While the device and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The device and method in accordance with the present application overcomes one or more of the above-discussed problems commonly associated with traditional approaches discussed above. In particular, the present invention provides a new clinical approach for in-situ, near real time quantification of the multifractal micro-optical properties (from the recorded tissue light scattering signal) for their use in the classification of different pathological grades of cancers/precancers. These and other unique features of the device are discussed below and illustrated in the accompanying drawings.

The device and method will be understood, both as to its structure and operation, from the accompanying drawings, taken in conjunction with the accompanying description. Several embodiments of the device may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

It is understood that terms such as "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Furthermore, the terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, an apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Any embodiment of any of the devices, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Figure 4A:
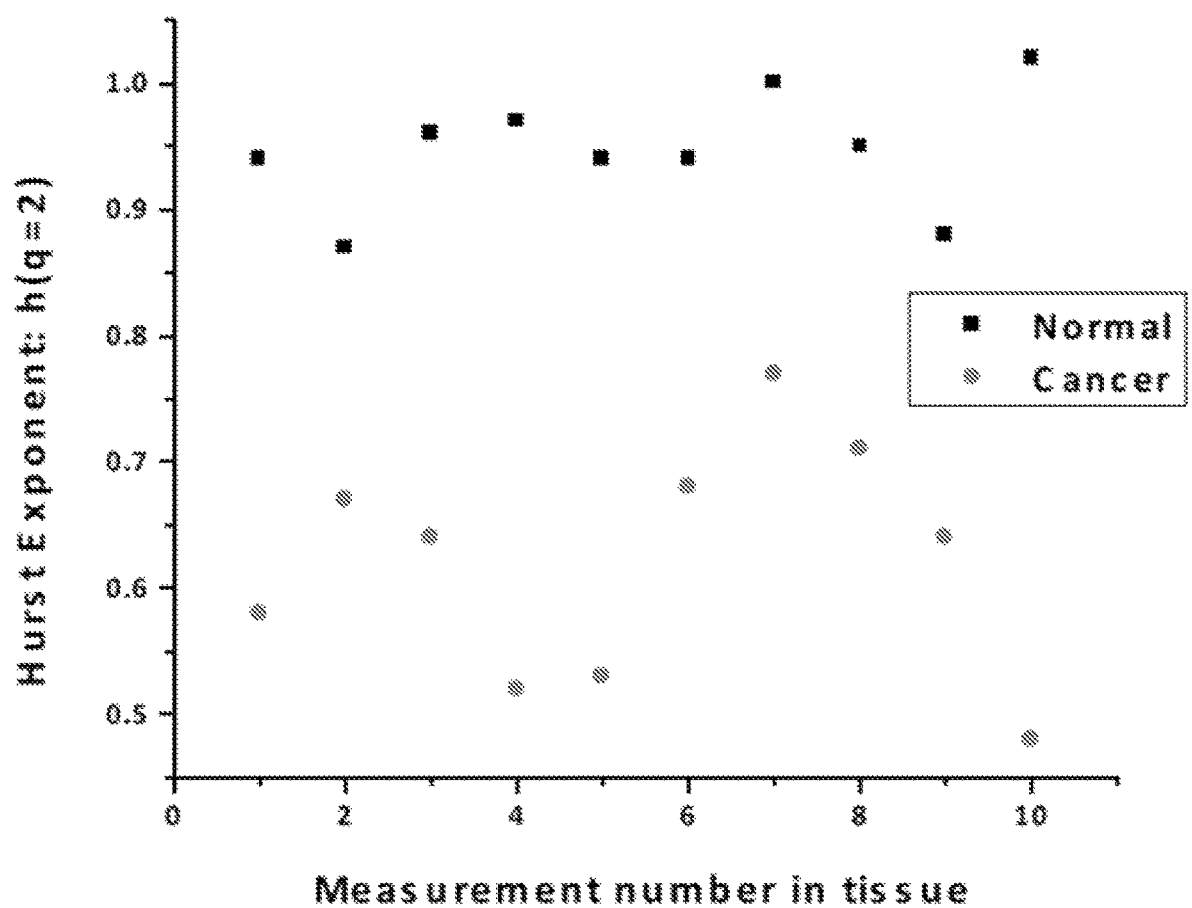
FIG. 4A is a graph of the discrimination of colon cancers from their normal counterpart based on the multifractal tissue optical properties, derived from white light scattering spectra, acquired and processed using the presently disclosed optic device and method.
Figure 4B:
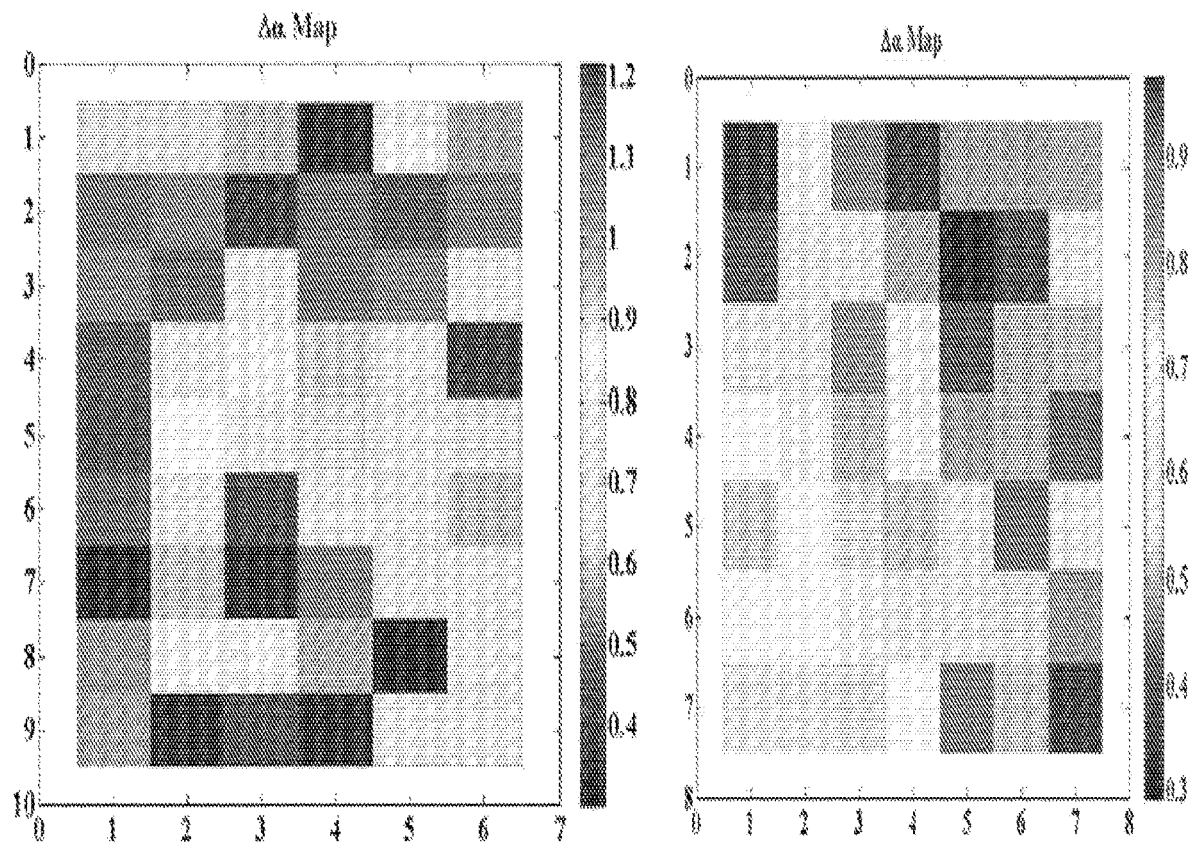
FIG. 4B shows the mapping of multifractality (width of singularity spectrum: $\Delta\alpha$) in normal (left) and cancer (right) tissue sections, derived from white light scattering spectra, acquired and processed using the presently disclosed optic device and method.

Since, elastically scattered light from any scattering object contains complete information about the spatial frequency spectrum of the object, the signature of any self-similarity in spatial scaling of refractive index (RI) inhomogeneities can potentially be probed by light scattering measurements (either angular or wavelength dependence of scattered intensity). We found that given a tissue light scattering signal (intensity as a function of wavelength, for a fixed scattering angle), it is indeed possible to extract and quantify the multifractal properties (FIGS. 4A and 4B). It is understood that Higher grades of cancers are associated with increased anti-correlations of index fluctuations (increased roughness) leading to reduction in Hurst exponent ($h(q=2)$); and stronger multifractality (increased width of singularity spectrum: $\Delta\alpha$).

This inverse light scattering method is based on Fourier domain pre-processing of light scattering signal via the Born approximation, followed by the Multifractal Detrended Fluctuation Analysis (MFDFA), which finally yields the multifractal parameters, namely, the generalized Hurst exponent Hurst exponent h q and width of the singularity spectrum $\Delta\alpha$ (a measure of the strength of multifractality). Unlike the bulk tissue optical properties, the derived multifractal tissue optical properties contain much finer and subtle morphological information on tissue ultra structure (even sub-micron level changes in the index inhomogeneity distribution of tissue are encoded in these parameters).

In the Born approximation of light scattering (which is well valid in low refractive index scattering media such as tissue), the scattered intensity (FIGS. 3A and 3B, as a function of wavelength for a fixed angle) is related to the Fourier transformation power spectra of the spatial variation of refractive index (RI). We make use of this to extract representative spatial distribution of index (in a statistical sense) using Fourier domain pre processing of light scattering intensity (as a function of wavelength or wave vector). This Fourier domain pre-processed signal is then subjected to the multifractal analysis.

We consider a weakly fluctuating scattering medium in Born approximation for normalized RI fluctuations $$\Delta n(r) \sim \frac{n(r) - n_0}{n_0},$$

the expression for scattered intensity is given by $$I(\beta) \approx k^4 \sigma^2 |\int \eta(r) e^{i(\beta \cdot r)} d^3 r|^2 \qquad (1)$$

Here, $k=2\pi/\lambda$, $\beta$ is the scattering vector with modulus $\beta=2k\sin(\theta/2)$, $\theta=180$, is the scattering angle in backscattered mode, $\lambda$ is the wavelength ($\beta=2\pi v$=spatial frequency); $\sigma = n_0 \delta n$ is the index inhomogeneities strength and $\eta(r)$ is spatial distribution of index inhomogeneities. The index inhomogeneities, which encodes the information of tissue multifractality can be obtained from the scattering signal as $$\eta/(p) \approx \int k^{-2} \sqrt{I(\beta=2\pi v)} e^{i(\beta \cdot r)} d^3\beta \qquad (2)$$

Here, $\eta/(p)$ contains the essential multifractal features of spatial index distribution in complex systems such as tissues. The encoded multifractal features in spatial index inhomogeneities are extracted by employing multifractal analysis. For this purpose, we have quantified the multifractal tissue optical properties by employing Multifractal Detrended Fluctuation Analysis (MFDFA) on the extracted spatial index inhomogeneities $\eta/(p)$, using Fourier pre-processed light scattering intensities.

The Multifractal Detrended Fluctuation Analysis (MFDFA) is a state of the art statistical tool capable of characterizing complex multi-affine processes and has been successfully deployed in diverse fields. Herein, we employ this method for characterizing refractive index multifractality by two multifractal parameters—(i) generalized Hurst exponent h q and (ii) Width of the singularity spectrum $\Delta\alpha$ (a quantitative measure of multifractality).

A statistically monofractal series is one whose variance follows a power law described by a single global scaling exponent, known as Hurst exponent H (0<H<1). A statistically multifractal series exhibits many fractal subsets characterized by different local Hurst exponents depends on order of moment q. Multifractal Detrended Fluctuation Analysis (MFDFA) is a state of art statistical approach to characterize such complex self-similar processes. Briefly, the fluctuation profile Y(i) of index inhomogeneities (series of length N, i=1 ... N) is divided into Ns=int (N/s) number of non-overlapping segments with equal length s. In each $m^{th}$ segment of the series ($y_m(i)$), the local trend is determined by least square polynomial fitting. These trends are then subtracted from the corresponding profile to yield the detrended fluctuations. Then the variance of the detrended fluctuation is determined as $$F^2(m, s) = \frac{1}{s}\sum_{i=1}^{S}[Y\{(m-1)s+i\} - y_m(i)]^2 \qquad (3)$$

The generalized moment (q) dependent fluctuation function is determined by $q^{th}$ order averaging the variances over all the segments as $$F_q(s) = \left\{\frac{1}{2N_s}\sum_{m=1}^{2N_s}[F^2(m,s)]^{\frac{q}{2}}\right\}^{1/q} \qquad (4)$$

The $q^{th}$ order moment dependent scaling behavior is subsequently studied considering power law scaling behavior $F_q(s) \sim s^{h(q)}$. Following this approach, any non-stationary multifractal fluctuation can be characterized via two sets of multifractal parameter (i) The generalized Hurst exponent h(q), and classical multifractal scaling exponent $\tau(q)$ (ii) The singularity spectrum $f(\alpha)$. These are related as $$\tau(q) = qh(q) - 1 \qquad (5)$$

$$\alpha = \frac{d\tau}{dq}, f(\alpha) = q\alpha - \tau(q) \qquad (6)$$

Where $\alpha$ is the singularity strength and the full width of $f(\alpha)$; $\Delta\alpha$ (defined at $f(\alpha)=0$) is a measure of multifractality.

The present invention provides, in one aspect, a device (FIG. 2) which records elastically (back) scattered broadband (white) light spectrum from a small volume near the tip of the fiber probe. The invention further provides a method (FIG. 1) wherein the refractive index multifractality is quantified using the Fourier domain pre-processing and MFDFA approach.

The multifractal properties are found to be highly sensitive in detecting colon cancerous alterations through an increase of multifractality (FIG. 4A/4B). In the higher grades of cancers, the refractive index fluctuations are found to be more anti-correlated (characterized by lower value of h q=2), and the strength of multifractality was observed to be considerably stronger (larger $\Delta\alpha$). Reduction in the value for h q=2 with increasing pathology is attributed to increasing tissue roughness, or effectively the predominance of index inhomogeneities having smaller dimensions.

The differences in the variations of h(q) between the normal and cancer tissues are more prominent for negative values of the moment q, which implies the relative importance of the small scale index fluctuations. This follows from the fact that negative values of the moment q influence the small fluctuations, whereas positive values influence large fluctuations. This also indicates that multifractal tissue optical properties capture subtle (otherwise hidden) changes in the index inhomogeneity (spatial) distribution of tissue (contributions of sub-micron level spatial index fluctuations) as signature of cancer.

Increased multifractality (larger value of $\Delta\alpha$) at higher grades of cancer (FIG. 4A/4B) is attributed to increased heterogeneity and the different scaling behavior of the small-scale and the large-scale index fluctuations.

In certain cancer or disease type, deployment of supervised statistical classifier like SVM is required to classify the overlapping of multifractal parameters exist between normal and diseased tissue. Support vector machines (SVMs) are powerful statistical classifiers under supervised learning scheme. The central idea behind SVM operation is to separate classes with a surface that maximizes margin between them by avoiding overfitting to form an optimal separating hyperplane (OSH). Hence by following structural risk minimization (SRM) of statistical learning makes prediction on a function $f(x)$ as:

$$f(x) = \sum_{i=1}^{N} w_i k(x, x_i) + w_0,$$

where k $(x, x_i)$ is the kernel function defined on a basis function, $\{w_i\}$ is the corresponding model weights and $w_0$ is the bias weight.

The training data points lie far away from the OSH, does not participate in the specification and hence receives zero weight. Data point lies close to decision boundary receives non-zero weights. These training data points are 'Support vectors'. If we remove these points, it will change the boundary location. Unlike relevance vector machine (RVM), there are restrictions while choosing of kernels in SVM.

An appropriate selection of kernel function is an important aspect as it defines the accuracy level of SVM based operation while determining training data classification. The kernel function will produce optimum results in classification as long as it obeys the Mercer's theorem. In this paper, we reported the linear SVM as an art of classification as it provided optimum sensitivity, specificity and reduced error rate than polynomial and RBF-SVM. At polynomial order d=1, the simplest kernel for a linear classifier is defined as the dot product of support vector $x_i$ and the data set x in the input space as: $k(x_i,x)=x_i.x+1$. The feature space should be as same as that of N-dimensional input space in order to form a linear OSH.

For example, a non-linear kernel like quadratic kernel i.e., d=2, can be expressed mathematically as: $k(x_i,x)=(x_i.x+1)^2$.

Mathematically, the Gaussian RBF kernel is written as:

$$k(x_i,x)=\exp(-\|x_i-x\|^2/2\sigma^2),$$

where $\sigma$ is the width of Gaussian. Varying $\sigma$ values optimum classification results are obtained.

Since the point (spectroscopic) measurement method typically probes ~millimeter-sized regions of tissue, the derived multifractal tissue scattering properties is a statistical representation of the index inhomogeneity distribution over the probed tissue volume. For spatial mapping of the multifractal tissue optical properties of biopsied samples or in-vivo, the fiber probe (FIG. 2) is maneuvered to enable recording of spatially resolved light scattering spectra from tissue. Thus, RI-MF values measured by elastic light scattering signal are mapped in tissue slices (FIG. 4B).

In another aspect, the present invention provides a graphical-user-interface software that allows near real-time determination of the multifractal parameters (h q=2, and $\Delta\alpha$) from the recorded tissue light scattering signal.

Figure 6:
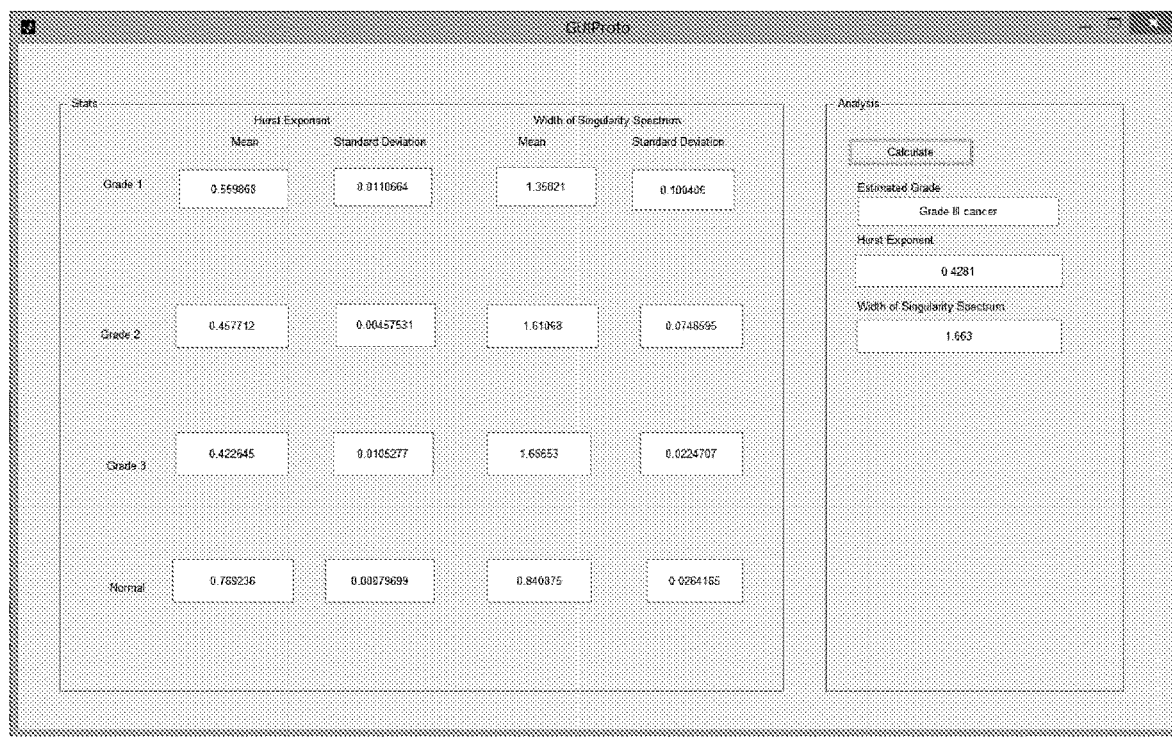
FIG. 6 is a sample screen shot from developed software for the differentiation of different pathology grades using the multifractal tissue optical parameters derived from light scattering spectra.
Figure 7:
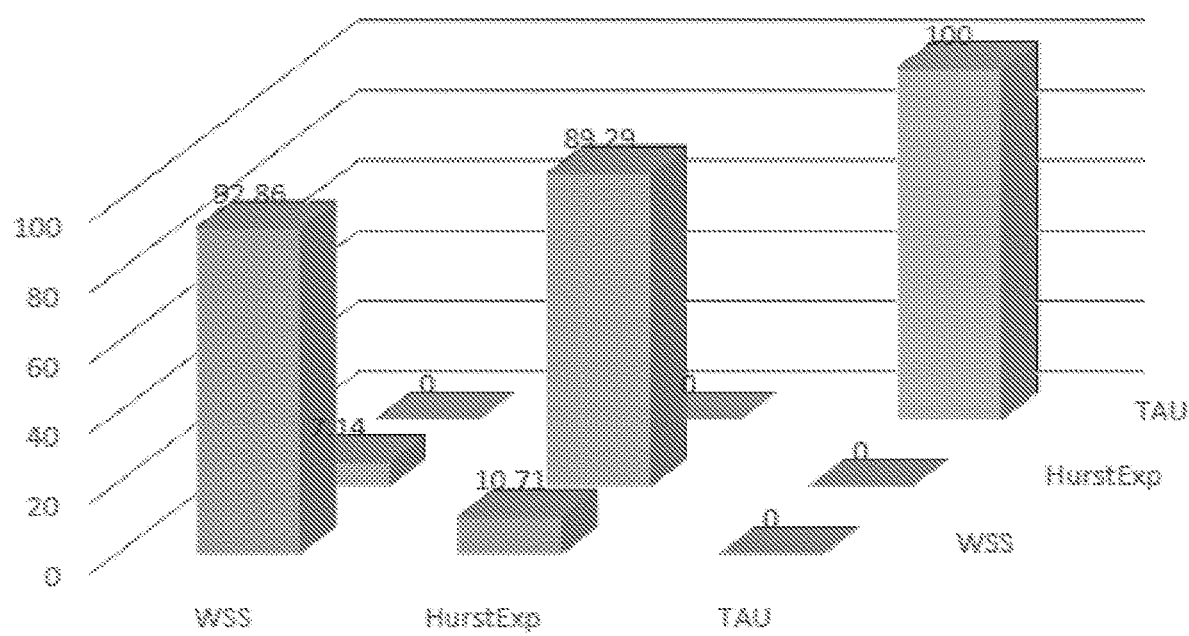
FIG. 7 is a chart showing an example of prediction analysis carried out by training the refractive index multifractal data using the optic device and method of the present application.
Figure 8:
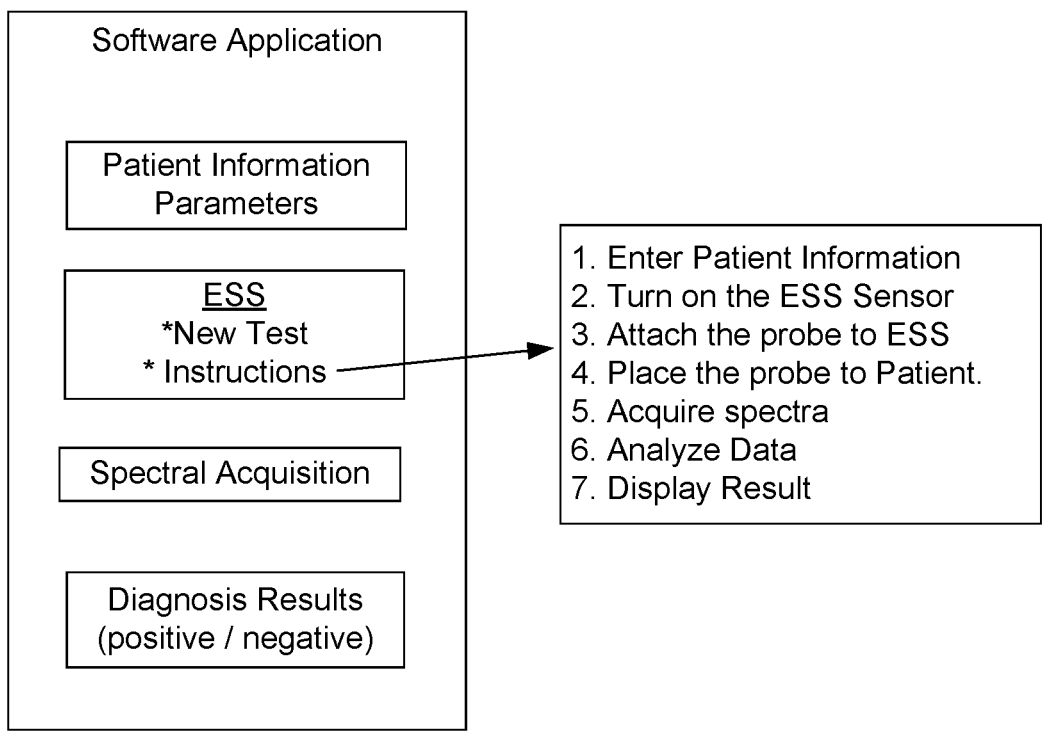
FIG. 8 illustrates a software application for use with the optic device and method of the present application for cancer diagnosis.

In another embodiment, the invention (software) includes classifiers (e.g. Hidden Markov model) for diagnostic classification of the different grades of precancers/cancers based on the multifractal parameters (FIGS. 6-8).

Further, the invention includes a smartphone App for near real-time determination of the multifractal parameters. It provides a simple and easy-to-use interface with a single click "run" tab to start the diagnosis process once the probe is in contact with the biological sample.

The entire system comprising of the experimental light scattering set-up, multifractal inverse analysis tool and the diagnostic algorithms is integrated in a user-friendly manner for invivo biomedical deployment. Rapid processing, portability and real time data analysis enable our device and method to be used in point-of-care (POC) settings.

Below, the presently disclosed invention will be further described by way of examples, which are provided for illustrative purposes only and accordingly are not to be construed as limiting the scope of the invention.

EXAMPLES

Example 1

Figure 2:
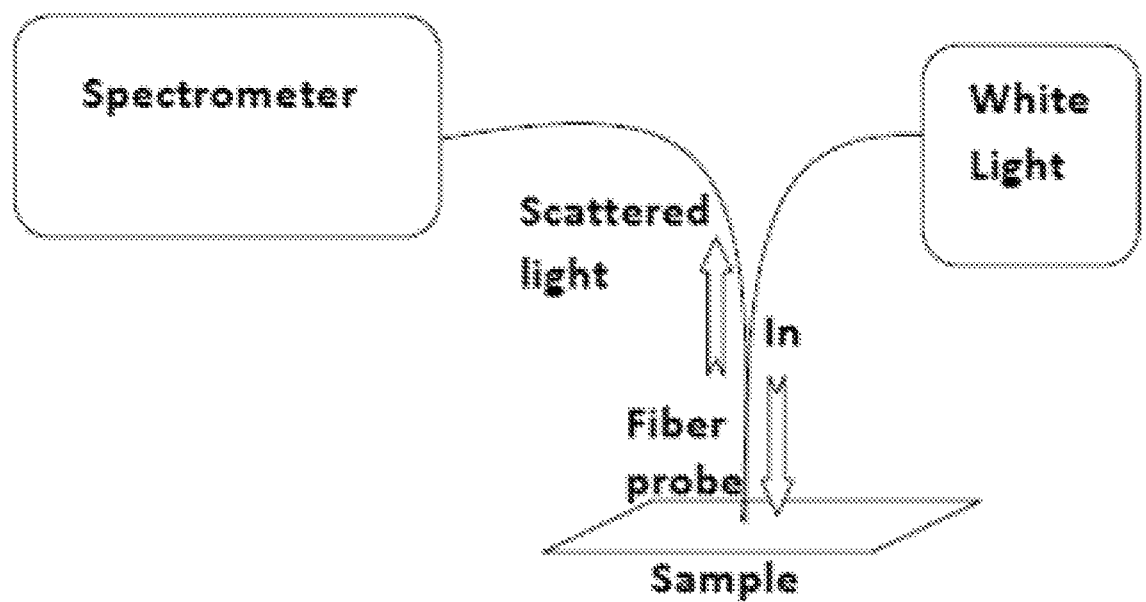
FIG. 2 illustrates a schematic of the optic device of FIG. 1 for quantifying refractive index multifractality for cancer screening.
Figure 3A:
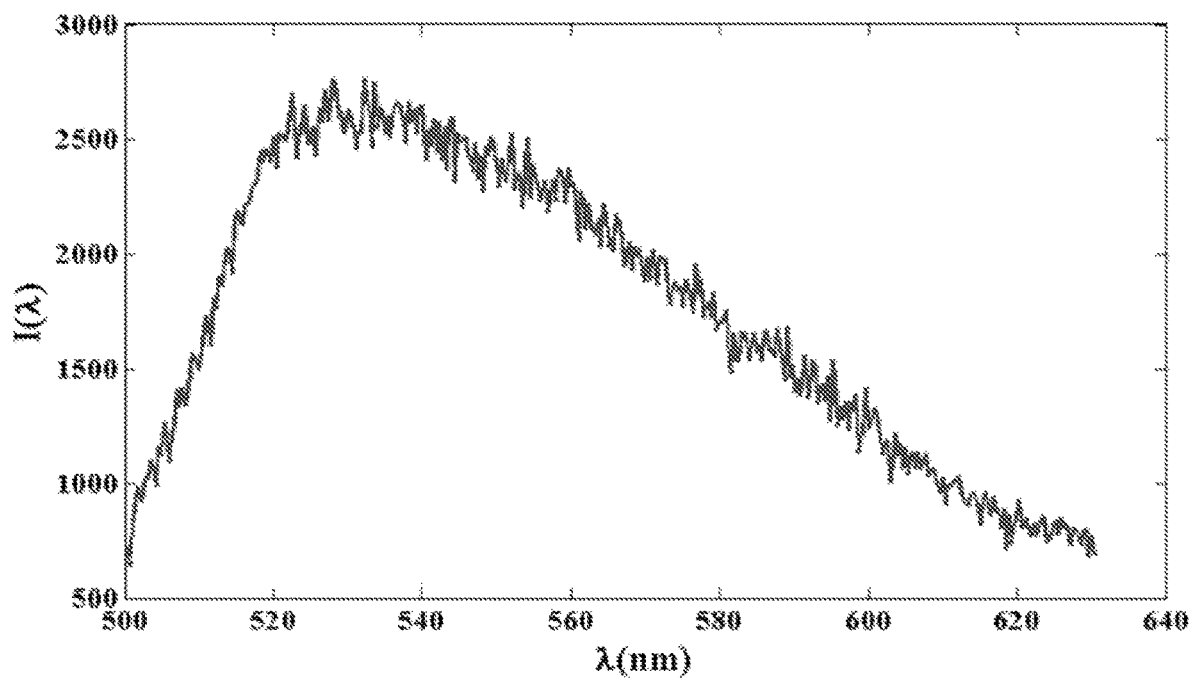
FIG. 3A is a graph of the scattering spectra (intensity as a function of wavelength) from colon tissue acquired using the optical device of the present application.
Figure 3B:
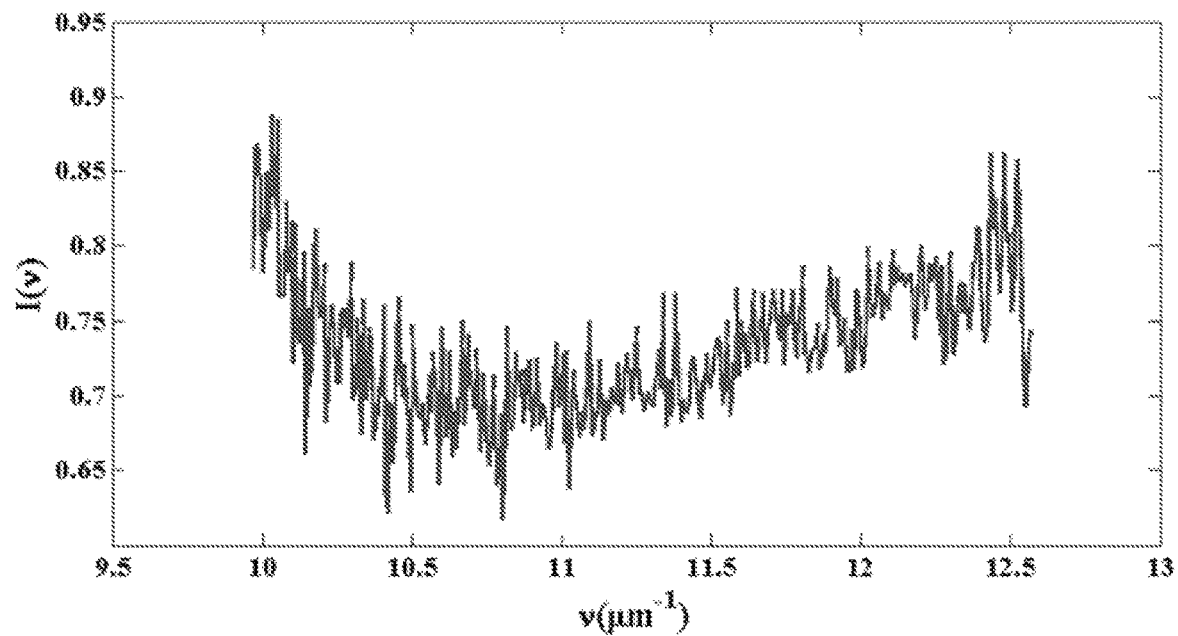
FIG. 3B is a graph of the Lamp normalized scattering spectra (intensity as a function of frequency) from the tissue.

In FIGS. 3A and 3B a representative spectrum acquired using the presently disclosed invention (device) is shown. FIG. 3A shows the Scattering spectra (intensity as a function of wavelength) from colon tissue acquired using the presently disclosed invention (device) while FIG. 3B shows the Lamp normalized scattering spectra (intensity as a function of frequency) from the tissue. Using the presently disclosed invention elastic scattering spectrum (ESS) is recorded from multiple sites in the tissue (FIG. 3A). The spectra are collected in the 400-700 nm spectral range. Based on the spectrum of the light source, the recorded spectrum is normalized (FIG. 3B). In one aspect, the present invention includes a flow chart outlining the various steps of the proposed inverse analysis of multifractality from ESS signal from tissues (FIG. 1). FIGS. 4A and 4B show illustrative examples of such multifractal analysis on Fourier domain preprocessed light scattering signal from a cancerous human colon tissue, confirmed by pathological examination. Refractive index multifractality (RI-MF) database for different cancer samples is now being classified based on the pathological result. This will allow establishment of RI-MF database.

Example 2

Figure 5:
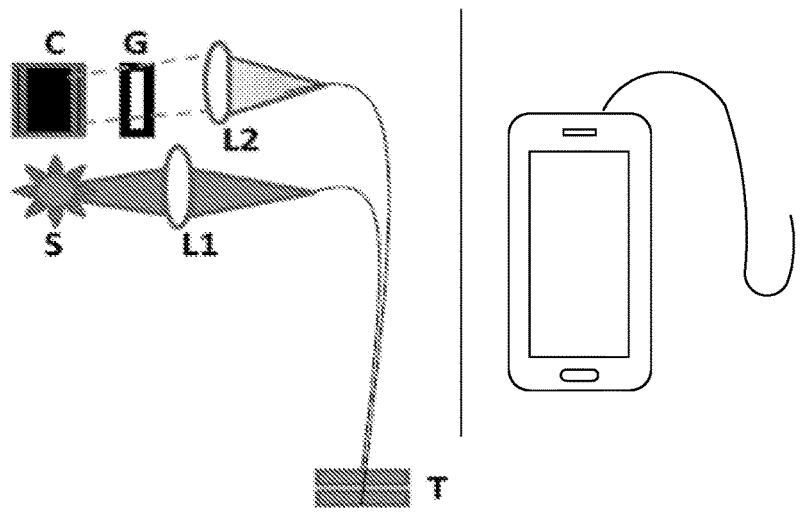
FIG. 5 is a chart of the optic device of the present application for cancer screening.

The prototype to measure elastic scattering spectroscopy (ESS) is attachable/mountable on smart-phone and may utilize the in-built light source, camera, processing power, visual interface, data transportation and battery power of the smart-phone. FIG. 5 shows the schematic and picture of the smart-phone mounted device. With internet connectivity, the smart-phone based device allows transmission of patient information and diagnostic scores via local internet provider. In greater detail, the left side is a schematic where S is a White light source in smart phone; L1&2 are Lenses; T is a Tissue (biopsy or in-vivo); G is a Holographic grating; and C is a CMOS camera in smart phone. The right side shows the Smart-phone mounted device with lead wires to the tissue.

FIG. 6 is a sample page from developed software for differentiation of different pathology grades using the multifractal tissue optical parameters derived from light scattering spectra. The mean values and standard deviations of the Generalized Hurst Exponent, Width of Singularity Spectra of samples (from the database) for different grades are shown in this column. The Calculate button calculates the value of the Generalized Hurst exponent, Width of Singularity spectrum and of the sample under investigation. It also displays the predicted grade of the sample based on binary classification.

Example 3

For evaluating prediction accuracy of classifying the abnormalities in tissue (e.g. cancer) based on refractive index multifractality parameters (e.g. Hurst exponent, width of singularity spectrum and multifractal scaling exponent) obtained from elastic scattering spectra, we first trained a 7 model state in hidden Markov model for each of the categories. The training set for each category includes time series data obtained from experimentation. The model trained by the training data is defined as $\theta=\{\pi, A, B\}$ and a sequence of seventeen states $S=\{s1, s2, \ldots s17\}$. $\pi$ denotes the prior probabilities, A is the transition probabilities and B denotes the emission probabilities. Prior probabilities are first selected as a random function. A and B are modeled as Gaussian densities with mean 0 and variance 1. Then the data is trained on the model iteratively to fit and modify the model using EM (Expectation maximization) algorithm. The model is optimized using Lagrange multipliers. We use forward and backward algorithm to compute a set of sufficient statistics for our EM step tractably. Once the Model is sufficiently trained for a given sequence of data we calculate the likelihood of sequence with model for each category. i.e, we calculate $P(X/\theta i)$ which is the sum of the joint likelihoods of the sequence over all possible state sequences Q allowed by the model for each category. The Maximum likelihood gives the prediction for the sequence data. FIG. 7 shows an example of the prediction analysis carried out by training the refractive index multifractal data (obtained from human colon cancer tissues using the device and method of the invention) in 7 model state of hidden Markov model. The parameters in width-axis shows predicted value for the parameter shown in the depth-axis. The height-axis displays the percentage of prediction accuracy. As can be clearly seen from the graph the parameters clearly create distinction between multifractal scaling exponent (TAU), width of singularity spectrum (WSS) and Hurst exponent (HurstExp). Data are correctly and accurately predicted as TAU all the time thus creates a zero chance of false prediction for the tested data set.

Example 4

FIG. 8 shows application software (i.e. Android compatible) for the in-built ESS sensor. Android is one of the widely used open source mobile platforms. Android offers new possibilities for mobile applications by offering an open development environment built on an open source Linux kernel. Hardware access is available to all applications through a series of API libraries, and application interaction, while carefully controlled, is fully supported. It is definitely free and open platform that differ hardware from software that runs on it. The Android platform is a device-independent platform, which means that our App can work for various devices. Our Android based application software (FIG. 8) provides a platform for user interaction, allowing the user to control the ESS sensor, obtain measurements, and view results. In the background, the software analyzes and converts the ESS spectra captured by the camera into meaningful clinical data set to construct diagnostic rules for the detection of cancer.

When the app is initiated, it prompts the user with a list of patient information parameters which can be selected by touching its labeled button. After selection of a particular patient parameter, the app then guides the user through the acquisition and measurement process, which consist of three user-initiated steps: a first step to ensure that the sensor is attached to the phone and a second step in which the sample probe is inserted into the sensor head, and third, the probe is in contact with the tissue, when the measurement is performed. Once the measurement is performed internal algorithms compute measurements of the desired parameters. Once refractive index multifractality (RI-MF) database for different cancer grades and/or types are collected, the app also performs grading of cancer (by correlating the measure RI-MF parameters with and display the result both numerically and on an animated scale with an indicator arrow. After the measurement result has been displayed, the user can immediately initiate another measurement using the button labeled "MEASURE" located above the displayed result. The navigation bar at the top of the app also allows the user to quickly navigate back to the title screen containing the list of parameters to perform a measurement of another site or patient. At any point during the measurement procedure, the user can press the home button on the app icon to exit the app completely. FIG. 8 illustrates the functional sequences of the described software operations.

Example 5

Figure 9A:
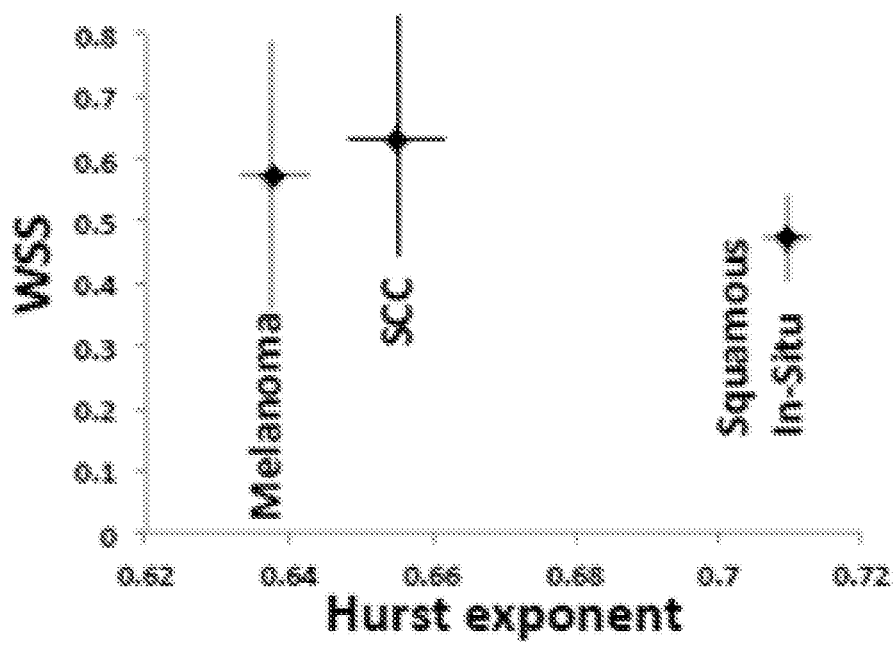
FIGS. 9A and 9B illustrate discrimination of different human (pre)cancers based on the light scattering-derived multifractal tissue optical properties determined using NanoSpectro Technology.
Figure 9B:
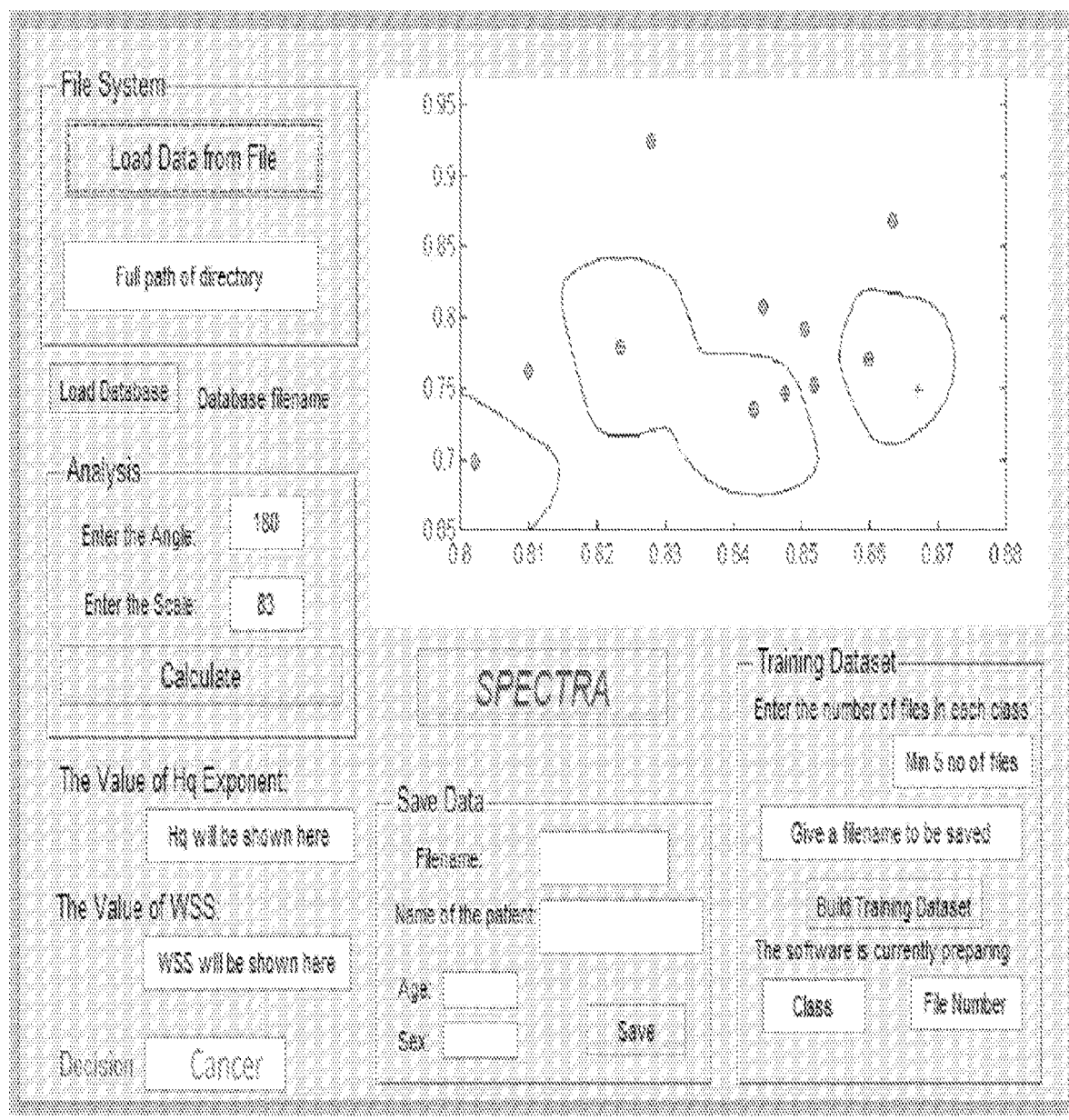

FIGS. 9A and 9B illustrates discrimination of different human skin (pre)cancers based on the light scattering-derived multifractal tissue optical properties determined using NanoSpectro Technology. The multifractal parameters, Hurst exponent $h(q=2)$, and width of singularity spectrum (WSS) form the two axes. In case of skin cancer types evaluated using the invention (device and analysis), it was found that the Hurst exponent (multifractal parameter) is lowest in case of Melanoma, followed by Squamous Cell Carcinoma (SCC) and significantly higher in case of Squamous In-Situ (precancer) as shown in FIG. 9A. Higher grades of cancers are found to be associated with increased anti-correlations of RI fluctuations (reduction in the Hurst exponent). FIG. 9(B) shows the software interface for detailed analysis and cancer classification.

Example 6

Figure 10A:
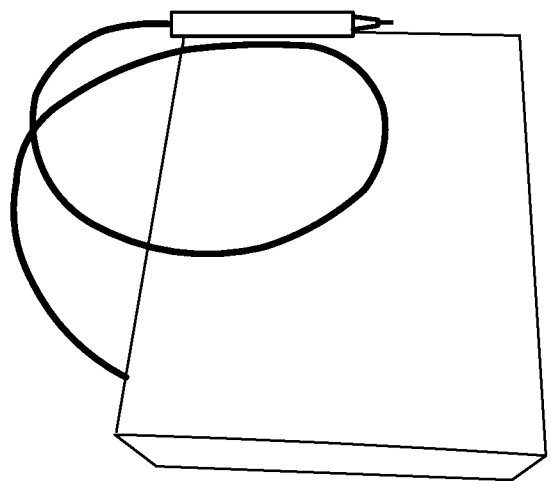
FIG. 10A shows a NanoSpectro Vivo prototype for painless in-situ cancer diagnosis.
Figure 10B:
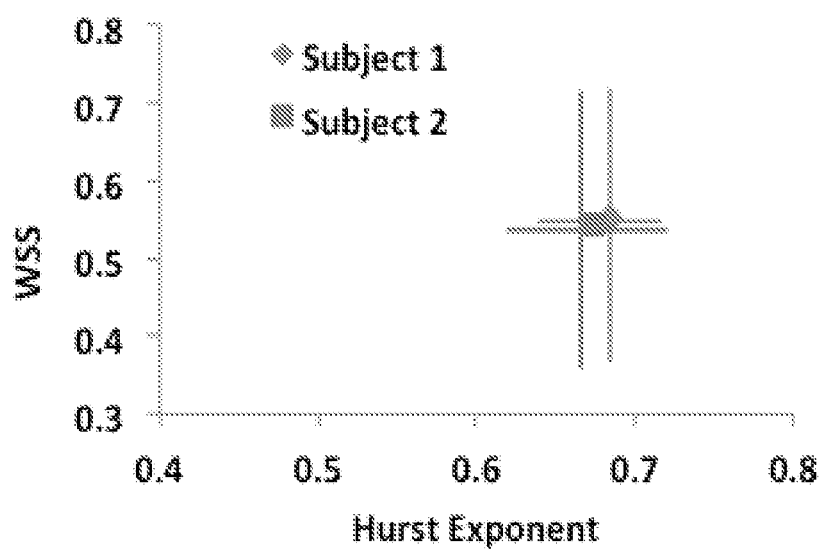
FIG. 10B shows a Fiber probe with angled probe.

FIG. 10A shows a NanoSpectro Vivo prototype for painless in-situ cancer diagnosis. Different probe shapes such as straight and angled are integrated to the illumination and collection fiber for analysis of tissue in-vivo. The prototype of FIG. 10A can be used in action on human skin. FIG. 10B shows the comparison of measured RI-MF parameters (Hurst exponent and WSS) at 10 different skin locations (i.e., hand, neck, back) between two healthy human subjects, measured by NanoSpectro-Vivo. No statistical significant difference between the two healthy subjects.

Example 7

Figure 11:
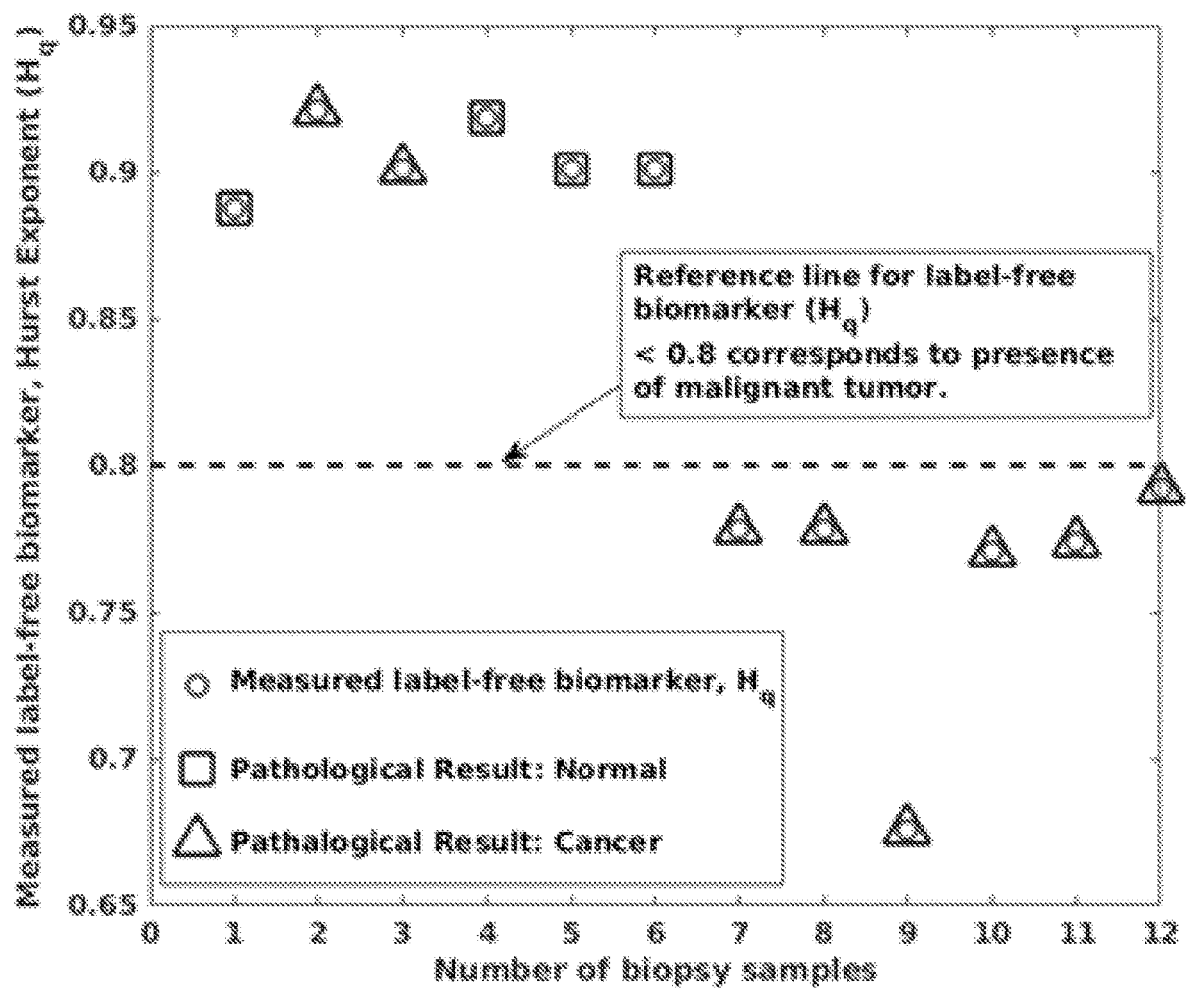
FIG. 11 is a chart showing measured optical biomarker for cancer detection matching well with pathological results obtained from patient's biopsy samples.

NanoSpectro-Vivo (optic device of the present application) can be used for cancer tissue analysis study during awake brain surgery. The optical biomarker used for classification is the multifractal parameter, Hurst exponent, $Hq=2$. FIG. 11 shows the measured optical biomarker (Hurst exponent, $Hq=2$) for disease (Lymphoma) detection in brain. The dotted line is drawn at Hurst exponent value of 0.8 to classify cancer from normal tissue. The measured optical biomarker (Hurst exponent) values were compared with pathological results from patient's biopsy samples, collected from same sites. The comparison between measured optical biomarker (Hurst exponent) values and pathological analysis of biopsy samples is shown in FIG. 11. Results indicate that our novel approach for brain cancer detection agrees well with the pathological classification of normal and cancer. However, the distribution of the Hurst exponent for another type of brain cancer (Glioblastoma Multiforme) was found to be different from that of the Lymphoma. Therefore, database and classification algorithms need to be developed and integrated with MFDFA analysis for disease diagnosis with high specificity and sensitivity.

Example 8

Figure 12:
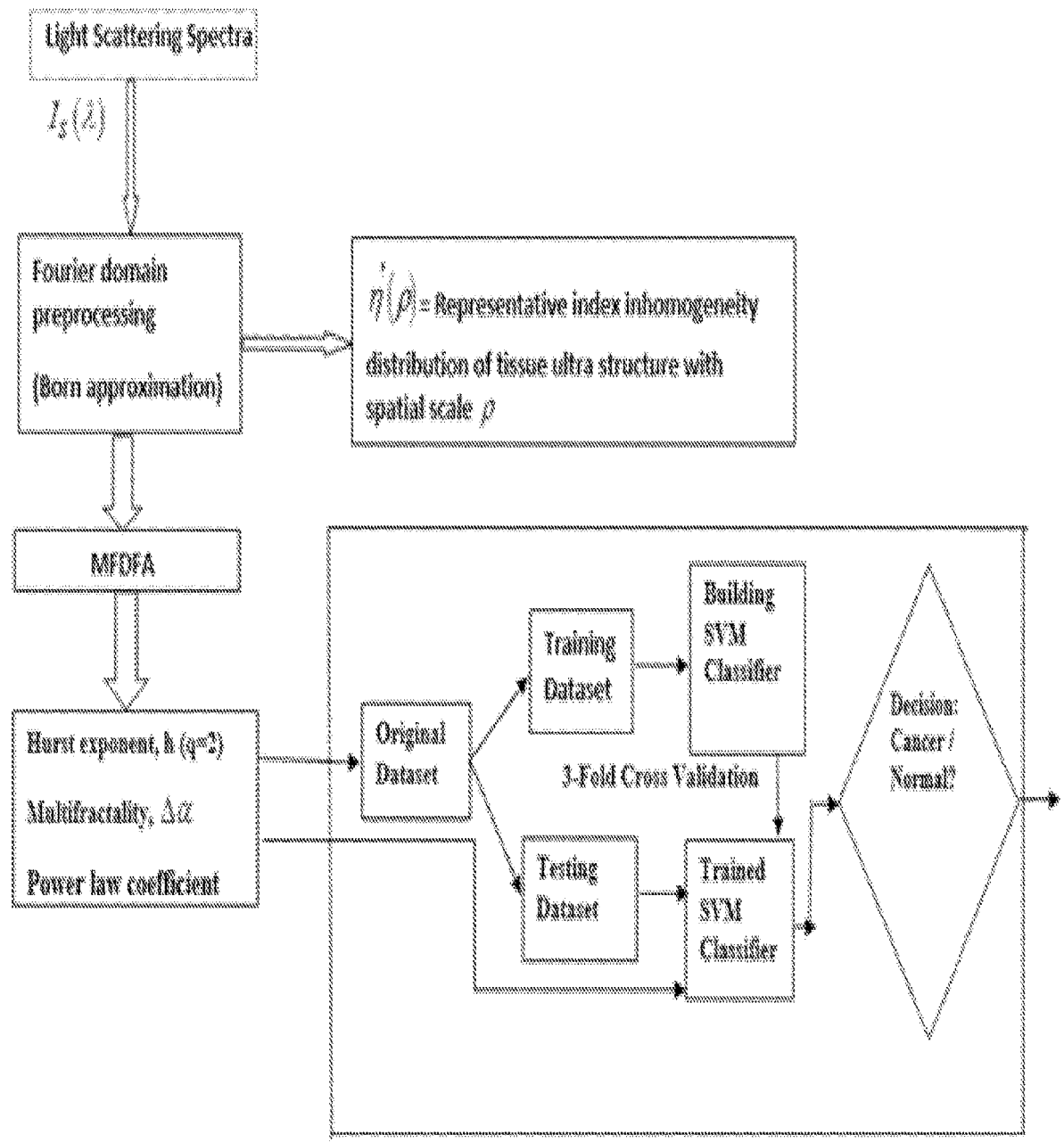
FIG. 12 is a flow chart for multifractal parameter extraction of recorded elastically-scattered spectrum.

Through a careful pathological staging and validation of tissue with light scattering based inverse analysis approach, a training data set of multifractal parameters needs to be formed and classified. A flow chart outlining the various steps of the inverse analysis of multifractality from the recorded elastic scattering signal from biopsied tissues and classification steps of multifractality parameter to increase accuracy of cancer detection is shown in FIG. 12. This is the whole analysis process and contains FIG. 1 flow chart. FIG. 1 may be replaced by this figure.

FIG. 12 shows a flow chart for multifractal parameter extraction of recorded elastically-scattered spectrum, the MFDFA analysis and support vector machine (SVM) based classification of tissue. (i) Broad band light sends through optical fiber and elastic light scattering recorded from tissue slices using same fiber probe in backscattering mode. (ii) Born approximation based Fourier domain preprocessing was applied to extract tissue index inhomogeneity. (iii) Extracted index inhomogeneity subjected to Multifractal Detrended Fluctuation Analysis (MFDFA) to extract multifractal parameter, namely Hurst exponent ($h(q=2)$), represents index correlation and the width of singularity spectrum, represent the strength of multifractality in tissue index distribution. (iv) Extracted multifractal parameter from numbers of tissue samples are used to train by support vector machine (SVM), a state of art classification method to increase accuracy of colon cancer detection.

Example 9

FIGS. 13A-13D shows an example of extraction of tissue multifractality through inverse analysis. The recorded normalized backscattering spectra through optical fiber probe of a tissue sample is shown in FIG. 13A. FIG. 13B displays detrended index fluctuation (scale length=8~20 µm) extracted through Fourier domain inverse analysis from normalized scattering spectra. Scale vs. fluctuation function plot (Eqn. 4) in FIG. 13C shows different slope for different order of moment indicates existence multifractality. FIG. 13D displays order of moment, q vs. generalized Hurst exponent, h(q) plot for healthy (green color) and cancerous (black color) colon tissue. The extracted Hurst exponent, $h(q=2)=0.80$ for a healthy colon and gets reduced to $h(q=2)=0.64$ for cancer colon indicates a reduction of index correlation as cancer progress. Inset of FIG. 13D displays singularity strength, a vs. singularity spectrum, f(α) plot (green circle for a healthy colon and black square for cancerous colon), and corresponding width of singularity spectrum or the strength of multifractality $\Delta\alpha=0.52$ for healthy colon and increased to $\Delta\alpha=0.81$ in cancerous colon indicates increase of roughness or heterogeneity as cancer progress. Increased multifractality (larger value of $\Delta\alpha$) at higher grades of cancer, is expected due to the increased heterogeneity and the different scaling behavior of the small-scale and the large-scale index fluctuations in the domain of different order of moments q.

Example 10

Figure 14:
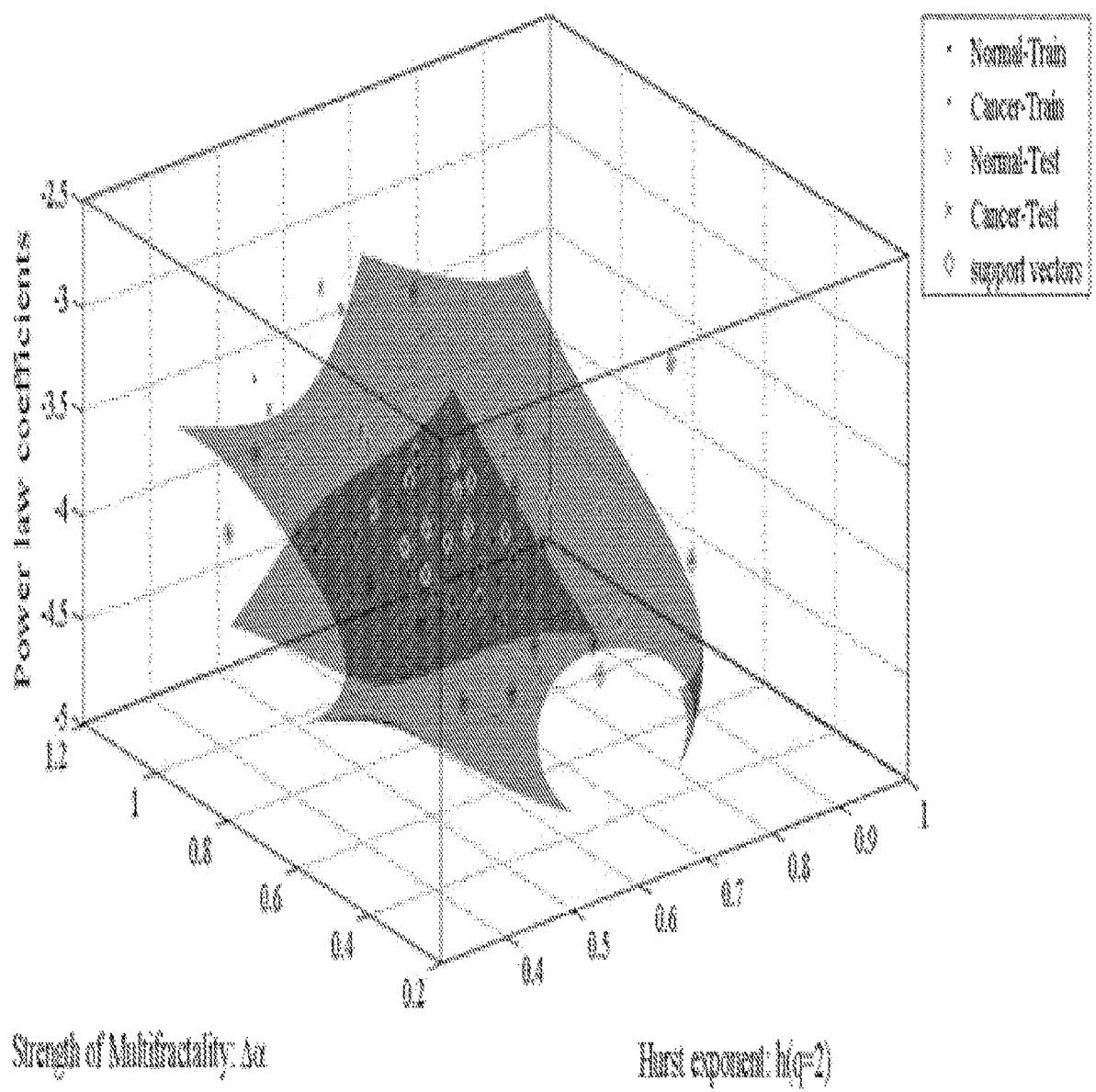
FIG. 14 is a graph of an example of the linear SVM based classification on the multifractal parameters extracted from elastic scattering spectra from wet colon tissue slices.

FIG. 14 shows an example the linear support vector machine (SVM) based classification on the multifractal parameters extracted from elastic scattering spectra from wet colon tissue slices. The effect of tissue preparation on sensitivity, specificity and error rate were observed while classifying the test data sets. The support vector machine (SVM) was deployed as a classifier of healthy and cancerous colon tissues. Hence the training data sets of wet tissues were prepared for tissue classifications on the basis of nonlinear parameters like Hurst exponent ($h(q=2)$), strength of multifractality ($\Delta\alpha$) and the power law coefficients (slope). The SVM was deployed as a classifier of healthy and cancerous colon tissues. Here, 90 training data points (40 normal and 50 cancerous) and 29 test data points have been taken from wet colon tissues for this SVM based classification. Optimum sensitivity, specificity and the error rates were achieved for colon tissue slices by the linear SVM based approach with polynomial order d=1. The data is spuriously distributed and the classifier plane best suited for this data is by forming multiple nonlinear regions The 3D curved layers represent the decision boundary. In initial SVM based exploration over colon tissues, SVM was deployed over two non-linear multifractal parameters Hurst exponent ($h(q=2)$), strength of multifractality ($\Delta\alpha$), which did not led to required high specificity values. Hence three non-linear parameters (Hurst exponent ($h(q=2)$), strength of multifractality ($\Delta\alpha$), power law coefficients (slope)) were explored, which led to improved results.

Example 7

Figure 15:
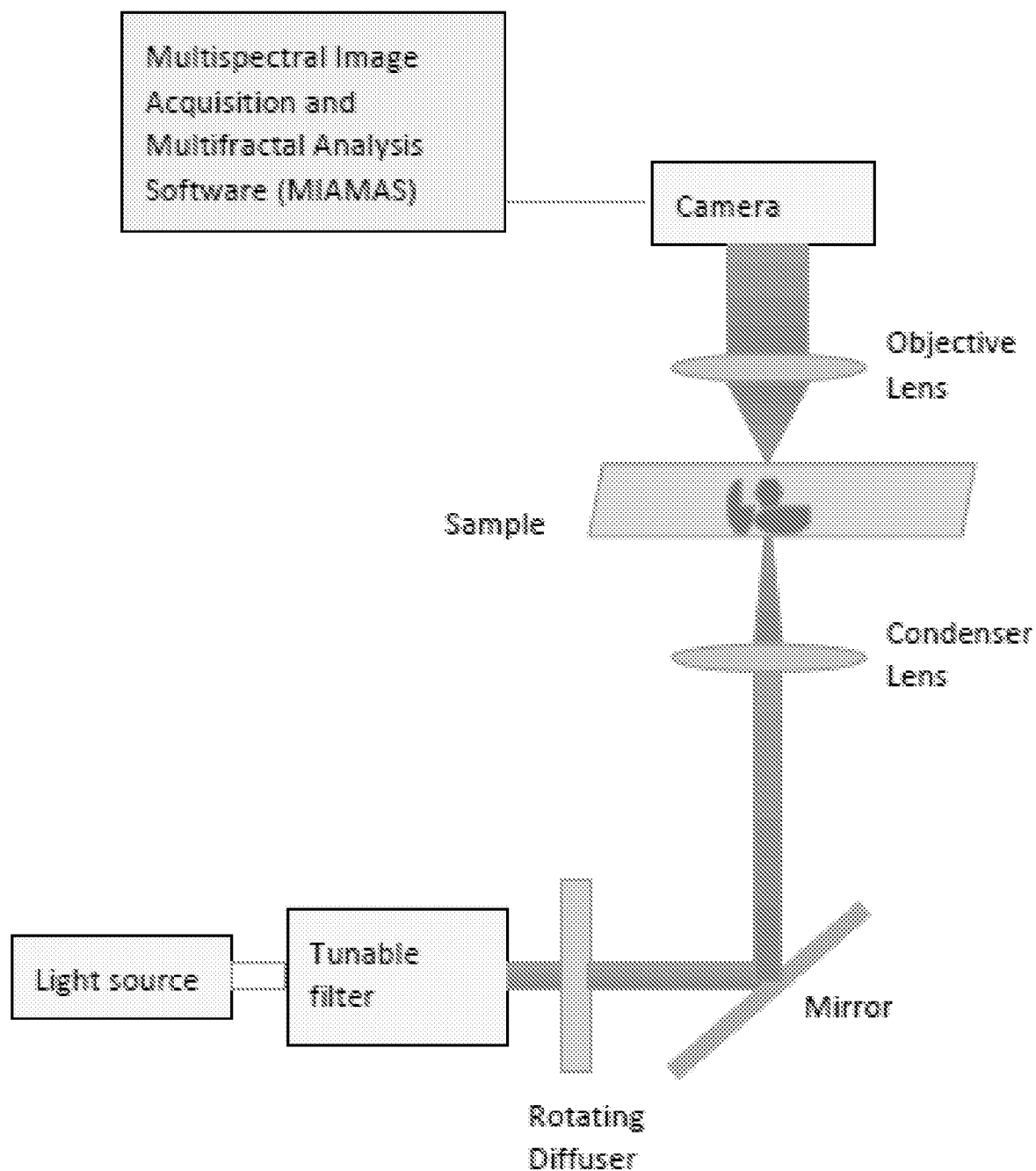
FIG. 15 is a schematic of an Integrated Spectral-Spatial Multifractal Imaging System (ISSMIS) to achieve multifractal mapping of a sample using the optic device and method of the present application.

FIG. 15 shows schematic of an Integrated Spectral-Spatial Multifractal Imaging System (ISSMIS) to achieve multifractal mapping of sample. A supercontinuum (white, broadband) laser source and scanning spectrometer is used to select center wavelength with narrow bandwidth (2 nm). The light source can be replaced by any other broadband light source. The tunable filter is a spectrometer, however, a filter wheel, a liquid crystal tunable filter or Acousto-Optic tunable filter can be used instead to select center wavelength with narrow bandwidth. The rotating diffuser is used to minimize speckles during use of the laser source. The narrow band light is coupled to the condensing lens via a folding mirror to illuminate a sample area>1 mm2. The transmitted narrowband images at different wavelengths are collected by an objective lens and acquired using a digital camera. For high throughput and automated image acquisition and multifractal analysis, the system is interfaced with Multispectral Image Acquisition and Multifractal Analysis Software (MIAMAS).

Example 8

The optic device and method of the present application is operable with Multispectral Image Acquisition and Multifractal Analysis Software (MIAMAS). The software allows connecting to the light source and camera; switching ON and OFF the light source; and selection of start central wavelength, bandwidth, and end wavelength. The interface control of the light source and camera as well as the control of start wavelength and bandwidth of light through the tunable filter are adjustable features and can be displayed. Further, it allows selection of wavelength interval at which images are to be acquired and time interval to acquire images using the camera, as well as file destination to save multispectral image sequences. The control of wavelength interval, end wavelength and imaging time interval are also optionally provided. Images of colon tissue slices at 2 nm intervals spanning from 450 to 700 nm range can be collected using the system and control software. Other intervals are also possible.

Example 9

The optic device and method of the present application is able to show spectral and multifractal analysis using the Multispectral Image Acquisition and Multifractal Analysis Software (MIAMAS). The option for selecting a point on the image to carry out spectral—multifractal analysis using the image series collected at different wavelengths is possible. Using analysis function, the intensity distribution at different wavelengths (i.e., spectrum) at selected pixel(s) of the image is displayed after loading the acquired image files. Display of spectrum at a selected point, which was saved for further analysis by MFDFA using the flowchart detailed in FIG. 1.

Because the presently disclosed invention (device and method) is essentially breaking new ground via the multifractal properties, work is currently under progress to explore entire relevant parameter space. The work-in-progress include rigorous evaluation of the specificity, sensitivity of the multifractal parameters towards cancerous changes in tissue morphology (for different types of cancers, mapping out the spatial accuracy of the approach, technological development of amenable experimental system, development of necessary algorithms/software for in-situ, near real time determination of the multifractal parameters for their subsequent use in classification of different pathological grades of cancers.

In the presently disclosed invention (device and method), the optical fiber can be easily adapted with endoscopic methods for diagnosis of cancer in cervix, colon and stomach. The field of cancer diagnostics is rapidly expanding; however, despite the best laboratory practices the rate of conclusive diagnosis by histological analysis for a range of cancers, including cervical, prostate, bladder, skin and oral cancer, is only 65-75%. Our non-invasive technology has potential to provide highly-sensitive diagnostics for many cancer types.

For obtaining high sensitivity/specificity (dependent on extraction of RI-MF parameters), spectral resolution better than 1 nm is used. However, higher spectral resolution corresponds to signature of larger structures in the Fourier domain. In fact, preliminary studies have been carried out to choose the limit of the maximum scale (size) in the MFDFA analysis. Since differences are always more prominent in smaller scales, the results of the analysis was not significantly affected by the upper limit of the scale size (corresponding to maximum resolution). If sensitivity/specificity is observed to be compromised, we obtain significant number of spectral data points by interpolation and then in the MFDFA the scale will be chosen to cover the actual spectral resolution. If still the sensitivity/specificity is measured to decrease in the tissue samples, higher resolution grating is used.

The presently disclosed invention (device and method) is modular (FIG. 2), i.e. the optical fiber probe is detachable from the device. FC-PC/SMA connector is used to connect the fiber patch cord with the spectrometer. This will ensure that in case the optical fiber breaks, it can be replaced.

Though spatial mapping of the multifractal tissue optical (RI-MF) properties of colon cancer samples is currently obtained (FIG. 4B) by scanning the sample stage or maneuvering the fiber using the presently disclosed invention (device and method), other scanning methods (e.g. scanning mirrors) and/or multiple fibers (forming a bundle) can be used to increase the throughput of the mapping process.

During cancer screening, discrepancy between RI-MF parameter based diagnosis using the presently disclosed invention and pathology may occur for early cancer patients, where ultra-structural cellular changes are not discernible in pathology. In those cases, longitudinal studies on measurement of RI-MF parameters and correlation with pathological results are to be-carried out.

The specification and examples herein provide a complete description of the structure and use of illustrative embodiments. Although certain embodiments have been described with a certain degree of particularity, or with reference to one or more individual embodiments, those skilled in the art could make numerous alterations to the disclosed embodiments without departing from the scope of this invention. As such, the various illustrative embodiments of the devices are not intended to be limited to the particular forms disclosed. Rather, they include all modifications and alternatives falling within the scope of the claims, and embodiments other than the one shown may include some or all of the features of the depicted embodiment. For example, components may be omitted or combined as a unitary structure, and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

Furthermore, the claims are not intended to include, and should not be interpreted to include, means-plus- or step-plus-function limitations, unless such a limitation is explicitly recited in a given claim using the phrase(s) "means for" or "step for," respectively.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A label-free optical device for near real time quantification of the multifractal micro-optical properties of a sample comprising:
    a source of broadband light;
    a tunable filter configured to receive at least a portion of the broadband light and then transmit narrowband light; whereby a specific band of light is selected to avoid unwanted absorption of light by the sample;

wherein the narrowband light is configured to illuminate a selected area of the sample, and in response elastically-scattered light is dispersed from the sample;

a light collection device configured to collect at least some of the elastically-scattered light;

wherein at least some of the collected elastically-scattered light is configured to be transmitted to a detector by the light collection device, and the detector is configured to record a light scattering signal; and wherein the detector is configured to perform light scattering signal measurements at multiple angles or wavelengths to determine a refractive index multifractality of the sample.

2. The optical device of claim 1, wherein the multifractality determination includes Fourier domain preprocessing of a light scattering spectrum carried out to derive the spatial distribution of the refractive index multifractality of the sample.

3. The optical device of claim 1, wherein the multifractality determination includes Multifractal Detrended Fluctuation Analysis applied on Fourier domain pre-processed light scattering data to finally yield the multifractal micro-optical properties that include at least one of a generalized Hurst exponent, and width of the singularity spectrum.

4. The optical device of claim 1, wherein the multifractality determination includes analysis of measurements of at least one of angular dependence of the elastically-scattered light and wavelength dependence of the elastically-scattered light.

5. The optical device of claim 1, wherein the detector is a camera.

6. The optical device of claim 1, wherein the tunable filter is at least one of the items selected from the group consisting of a spectrometer, a filter wheel, a liquid crystal tunable filter, and an acousto-optic tunable filter.

7. The optical device of claim 1, further comprising a light delivery device configured to collect at least a potion of the scattered light from the sample and transmit that scattered light to the detector, wherein the light delivery device is at least one of the items selected from the group consisting of optical fiber and free-space optics.

8. The optical device of claim 1, wherein the light collection device is at least one of the items selected from the group consisting of an optical fiber and an objective lens.

* * * * *